United States Patent [19]

Hirota et al.

[11] Patent Number: 5,113,524
[45] Date of Patent: May 12, 1992

[54] QUANTUM STATE CONTROL APPARATUS, OPTICAL RECEIVER AND OPTICAL COMMUNICATION SYSTEM

[75] Inventors: Osamu Hirota, 22-13, Gontazaka-1-chome, Hodogaya-ku, Yokohama; Hideaki Tsushima, Hachioji; Shinya Sasaki, Kodaira; Yoshitaka Takasaki, Tokorozawa; Minoru Maeda, Nishitama, all of Japan

[73] Assignees: Hitachi, Ltd., Tokyo; Osamu Hirota, Yokohama, both of Japan

[21] Appl. No.: 412,510

[22] Filed: Sep. 27, 1989

[30] Foreign Application Priority Data

Sep. 30, 1988 [JP] Japan ................. 63-244100
Apr. 28, 1989 [JP] Japan ................. 1-107673

[51] Int. Cl.⁵ ................. H04B 10/00; H04J 14/00
[52] U.S. Cl. ................. 359/115; 359/173; 359/189; 359/190
[58] Field of Search ................. 455/617, 618, 619, 606, 455/616, 611, 609, 600; 370/1, 3, 4, 2; 372/18

[56] References Cited

U.S. PATENT DOCUMENTS

| | | | |
|---|---|---|---|
| 4,635,246 | 1/1987 | Taylor et al. | 455/617 |
| 4,860,279 | 8/1989 | Falk et al. | 455/617 |
| 4,897,830 | 1/1990 | Hill et al. | 455/617 |

OTHER PUBLICATIONS

Physical Review, A, vol. 38, No. 9 (1988), pp. 4696–4711.
Physical Review A13, No. 6, Jun. 1976, pp. 2226–2243.
Optics Letters, vol. 8, No. 5, pp. 256–258.
Physical Review Lett., vol. 57, No. 20, pp. 2520–2523, 1986.
Nikkei Science, vol. 18, No. 7, pp. 48–58.

*Primary Examiner*—Reinhard J. Eisenzopf
*Assistant Examiner*—Kinfe-Michael Negash
*Attorney, Agent, or Firm*—Pennie & Edmonds

[57] ABSTRACT

An optical receiver includes a squeezer for changing the quantum state of a signal lightwave to a squeezed state, a slave laser put in an injection locking state by the signal lightwave outputted from the squeezer, and an optical homodyne detector for carrying out optical homodyne detection for the signal lightwave outputted from the slave laser.

17 Claims, 15 Drawing Sheets ized power). However,
QUANTUM STATE CONTROL APPARATUS, OPTICAL RECEIVER AND OPTICAL COMMUNICATION SYSTEM

BACKGROUND OF THE INVENTION

The present invention relates to a quantum state control apparatus, an optical receiver and an optical communication system which can greatly improve the receiving sensitivity and bit error rate in coherent optical communication The signal-to-noise ratio in a coherent optical communication system is limited by the quantum noise contained in a signal lightwave, the noise caused by a local oscillator, and a dark current and thermal noise in the optical receiver At present, the above signal-to-noise ratio can be increased to a level determined by the quantum noise contained in a signal lightwave. FIG. 2 shows an example of a conventional coherent optical communication system. In FIG. 2, reference numeral 1 designates an optical transmitter for sending out a signal lightwave with a coherent state, 2 a transmission line for transmitting the signal lightwave and 3 an optical homodyne detector. The optical homodyne detector is explained in Chapter 6 (in more detail, on pages 228 and 229) of a book entitled "Optical Communication Theory and Its Application", and published by Morikita Publishing Co. in 1988 (the above book will be hereinafter referred to as "reference 1"). Recently, in order to further improve the above signal-to-noise ratio, it has been proposed to utilize a physical phenomenon capable of controlling the quantum state of light and reducing the quantum noise contained in a signal lightwave. That is, a technique for generating a squeezed state (or two-photon coherent state) is used (Physical Review, A13, No. 6, June, 1976, pages 2226 to 2243). The term "squeezed state" means a state in which two quadrature components (namely, two complex amplitude components perpendicular to each other) of light are different in quantum noise from each other. On the other hand, the light used in a conventional coherent optical communication is the so-called coherent state. In other words, the two quadrature components of this conventional coherent light are equal in quantum noise to each other.

It is now proposed to use the above quantum state control technique (that is, squeezed-state generating technique) for the purpose of controlling the quantum state of a signal lightwave in an optical transmitter, as shown in FIG. 3. In FIG. 3, reference numeral 4 designates an optical transmitter for sending out a signal lightwave with a squeezed state, and reference numerals 2 and 3 designate the same parts as shown in FIG. 2. When a signal lightwave has a coherent state, the quantum noise of each of two quadrature components of the signal lightwave is $\frac{1}{4}$ (in normalized power). However, when the signal lightwave has a squeezed state, the quantum noise of one of the two quadrature components can be made equal to $\frac{1}{4}e^{-Z}$, and the quantum noise of the other component can be made equal to $\frac{1}{4}e^{Z}$ (where Z indicates a squeezed parameter). As a result, where the quantum state of transmitted light is the coherent state as in ordinary coherent optical communication, the theoretical value of the signal-to-noise ratio of the communication system is equal to $4<n>$. On the other hand, where the transmitted light has a squeezed state, and one quadrature component low in quantum noise is used as an information signal, the theoretical value of the signal-to-noise ratio is equal to $4<n>-(<n>+1)$. The above symbol $<n>$ indicates the mean value of the number of photons included in a single optical signal pulse. As is evident from the above, the signal-to-noise ratio of a coherent optical communication system can be improved in a great degree by putting signal lightwave in a squeezed state. Details of such a matter are described in Chapters 1 and 2 (in more detail, on pages 34 to 36 and 48 to 51) of the reference 1.

However, in a case where the quantum state of signal lightwave is controlled in the optical transmitter as mentioned above, the squeezed state of the signal lightwave is destroyed when encountered in the transmission line for communication. Thus, the signal-to-noise ratio of the communication system is decreased, and the advantage of the quantum state control technique is lost. That is, when the quantum state control technique is applied to an actual communication system, there arises a series problem. Details of the above phenomenon are described in Chapter 2 (in more detail, pages 48 to 51 and FIG. 2.8) of the reference 1.

As mentioned above, the conventional quantum state control technique for improving the transmission characteristics in coherent optical communication cannot produce an expected effect when an energy loss is encountered in a transmission line for communication.

SUMMARY OF THE INVENTION

It is a first object of the present invention to provide an optical receiver which can solve the problem that the advantage of the quantum state control technique is lost by the energy loss in a transmission line, and has signal-to-noise ratio characteristics (much better) than those in a conventional coherent optical communication system.

It is a second object of the present invention to provide a quantum state control apparatus for use in the above optical receiver.

It is a third object of the present invention to provide an optical communication system which includes the above optical receiver.

In order to attain the first object, an optical receiver according to the present invention includes a beam splitter for separating a signal lightwave into first and second beams, a pumping laser put in an injection locking state by the second beam, a second harmonic generator for doubling the frequency of the output light of the pumping laser, a squeezer supplied with the output light of the second-harmonic generator for changing the quantum state of the first beam to a squeezed state, and an optical homodyne detector for carrying out homodyne detection for the output light of the squeezer.

In order to attain the second object, a quantum state control apparatus according to the present invention includes a beam splitter for separating signal lightwave into first and second beams, a pumping laser put in an injection locking state by the second beam, a second-harmonic generator for doubling the frequency of the output light of the pumping laser, and a squeezer supplied with the output light of the second-harmonic generator for changing the quantum state of the first beam to a squeezed state.

In order to attain the third object, an optical communication system according to the present invention includes an optical transmitter, a transmission line for communication, and the above-mentioned optical receiver.

The present invention is based upon a discovery about the operation of a quantum state control apparatus disposed on the receiving side.

Now, let us suppose that the output light from the light source of an optical transmitter is kept at a coherent state, and a signal lightwave is modulated with binary phase shift keying (BPSK). It is to be noted that the phase angle of a PSK signal is set to 0° and 90° for the logical values "1" and "0" of information, respectively. In other words, an optical signal corresponds to the amplitude $X_C$ of the cosine component of lightwave and the amplitude $X_S$ of the sine component. When the light kept at the coherent state is propagated through a transmission line having an energy loss, the output light from the transmission line is also put in a coherent state. When the output light is detected directly, a signal-to-noise ratio is obtained which is equal to $4<n_R>$ (where $<n_R>$ indicates the number of photons included in a single optical signal pulse which is sent out from the transmission line for communication. This value of signal-to-noise ratio is usually called a "shot noise limit".

According to the present invention, coherent light from a transmission line for communication is separated by a beam splitter into two beams, one of which is incident to a squeezer as the optical signal. The other beam is injected into an end portion of a pumping laser which is used as a pumping light source of the squeezer. The squeezer is an apparatus for squeezing one of the cosine and sine components of incident light. In other words, the squeezer amplifies one of the cosine and sine components, and attenuates the other component. When pumping light for the squeezer has a phase angle of 0°, the squeezer amplifies both of the signal and quantum noise of the cosine component of incident light by a factor of G, and attenuates both of the signal and quantum noise of the sine component to 1/G of input values. The signal-to-noise ratio of the cosine component which is used as an information signal is equal to $4<n_R>$, as in the input light of the squeezer FIG. 4 shows relations in this case between a signal and noise. In FIG. 4, the abscissa of an orthogonal coordinate system indicates the amplitude of the cosine component of the electric field of signal lightwave, and the ordinate of the system indicates the amplitude of the sine component. Further, reference symbol $E_R$ in FIG. 4 designates the amplitude of the cosine component of the input light to the squeezer, and is equal to $\sqrt{<n_R>}$.

When the pumping light for the squeezer has a phase angle of 180° (namely, $\pi$), the squeezer attenuates the cosine component of the incident light to $1/G_S$ of an input state, and amplifies the sine component by a factor of $G_S$ (Physical Review A38, No. 9, Nov., 1988, pages 4696 to 4711). Hence, when supplied with the input light of FIG. 8, a quantum state control apparatus according to the present invention sends out the signal lightwave of FIG. 5.

Now, explanation will be made of the operation principle of our quantum state control apparatus which can greatly improve the bit error characteristics of coherent optical communication by utilizing the above squeezing characteristics.

Transmitted light is given by the following equation:

$$E_T \cos(\omega_S t + \Phi_S) = X_C \cos \omega_S t + X_S \sin \omega_S t \qquad (1)$$

That is, a modulated signal is a BPSK (binary phase shift keying) signal, in which the phase angle $\Phi_S$ is made equal to zero radian or $\pi/2$ radian. Thus, the amplitude of the transmitted light becomes equal to $X_C$ and $X_S$ in accordance with phase angles of zero and $\pi/2$ radian, respectively. The absolute value of each of $X_C$ and $X_S$ is equal to an amplitude $E_T$. Further, $\omega_S$ indicates the angular frequency of the transmitted light.

Signal lightwave outputted from a transmission line for communication is given by the following equation:

$$\sqrt{K} E_T \cos(\omega_S t + \phi_S) = E_R \cos(\omega_S t + \Phi_S) \qquad (2)$$

FIG. 8 shows relations between the signal and noise of the above signal lightwave. A factor $\sqrt{K}$ in the equation (2) indicates the transmission coefficient of the transmission line, and $\sqrt{K} E_T$ is equal to $E_R$. The signal lightwave is separated by a beam splitter into two beams, one of which is expressed by $\sqrt{\eta} E_R \cos(\omega_S t + \Phi_S)$. The other beam is expressed by $\sqrt{1-\eta} E_R \cos(\omega_S t + \Phi_S)$. In the above, $\sqrt{\eta}$ indicates a splitting ratio, and $\eta$ satisfies a formula $0<\eta<1$. One beam expressed by $\sqrt{\eta} E_R \cos(\omega_S t + \Phi_S)$ is incident, a signal lightwave, on an input end of the squeezer. The other beam is incident, as an injection locking signal, on a laser for pumping the squeezer In this injection locking system, the phase angle of the output light of the laser is equal to zero or $\pi/2$ radian in accordance with whether the phase angle of the signal lightwave is equal to zero or $\pi/2$ radians. In order to operate the squeezer in synchronism with the signal lightwave, it is necessary to make a pumping frequency equal to $2\omega_S$. Accordingly, the output light of the pumping laser which is put in an injection locking state by the signal lightwave, is supplied to a second-harmonic generator to generate a lightwave having an angular frequency $2\omega_S$ and a phase angle $2\phi_S$. When the output power of the pumping laser is made sufficiently large, the output light of the second harmonic generator will have enough power to operate the squeezer.

When the phase angle $\Phi_S$ of the transmitted signal is equal to zero, light for pumping the squeezer has a phase angle of zero. When the phase angle $\Phi_S$ of the transmitted signal is equal to $\pi/2$ radian, the pumping light has a phase angle of $\pi$ radian. Accordingly, when the transmitted signal incident on the squeezer has a phase angle of zero ($\phi_S=0$), the squeezer sends out a signal lightwave indicated by the following equations:

$$\begin{cases} X_{C(out)} = \sqrt{G_S} \sqrt{\eta} X_{C(in)} = \sqrt{G_S \eta} E_R \\ \Delta X^2_{C(out)} = \dfrac{G_S}{4} \end{cases} \qquad (3)$$

$$\begin{cases} X_{S(out)} = 0 \\ \Delta X^2_{S(out)} = \dfrac{1}{4G_S} \end{cases} \qquad (4)$$

where $G_S$ indicates the degree of squeezing due to squeezer, $X_{C(out)}$ the amplitude of the cosine component of signal lightwave outputted from the squeezer, $\Delta X^2_{C(out)}$ the variance of the quantum noise of the cosine component, $X_{S(out)}$ the amplitude of the sine component of the signal lightwave, and $\Delta X^2_{S(out)}$ the variance of the quantum noise of the sine component.

When the transmitted signal supplied to the squeezer has a phase angle of $\pi/2$ radian ($\Phi_S = \pi/2$), the squeezer sends out a signal lightwave indicated by the following equations:

$$\begin{cases} X_{S(out)} = \sqrt{G_S} \sqrt{\eta} \, X_{S(in)} = \sqrt{G_S \eta} \, E_R \\ \Delta X^2_{S(out)} = \dfrac{G_S}{4} \end{cases} \quad (5)$$

$$\begin{cases} X_{C(out)} = 0 \\ \Delta X^2_{C(out)} = \dfrac{1}{4G_S} \end{cases} \quad (6)$$

The state of the signal lightwave outputted from the squeezer is shown in FIG. 5. It is to be noted that FIG. 5 corresponds to a case where the phase and amplitude of pumping light do not fluctuate. It will be explained that the above-mentioned system has the characteristics shown in FIG. 5. Both of the signal lightwaves separated by a beam splitter have phase fluctuations caused by quantum noise. One of the two beams is incident, as signal lightwaves, on the squeezer, and the other beam is incident on the pumping laser, to put the pumping laser in an injection locking state. The phase fluctuation of the output light from the pumping laser is nearly equal to that of the beam incident on the pumping laser, and is given as follows: $\Delta\phi^2$ (output of the pumping laser put in injection locking state)

$$\approx \frac{1}{(1-\eta)E_R^2}.$$

It has been known that a second harmonic generator acts as a squeezer for incident light (Optics Letters, Vol. 8, No. 5, 1983, pages 256 to 258). Accordingly, the second-harmonic generator does not only produce a second-harmonic lightwave, but also serves as a squeezer for reducing phase fluctuations at the tolerable penalty of increasing amplitude fluctuations. Thus, the phase fluctuation of output light from the second-harmonic generator (SHG) are given by the following equation:

$$\Delta\phi^2_{(SHG)} = \frac{1}{G^2_{(SHG)}} \Delta\phi^2 = \frac{1}{G_{(SHG)}} \cdot \frac{1}{(1-\eta)E_R^2}$$

where $G_{SHG}$ indicates the degree of squeezing due to the SHG. It should be noted that, the amplitude fluctuations of light incident on the SHG are amplified by the SHG. The output light from the SHG is incident, as pumping light, on a squeezer. It has been known that the phase fluctuations of pumping light exchange squeezing axes for each other, and the amplitude fluctuations of the pumping light vary the degree of squeezing (Phys. Rev. A38, No. 9, Nov., 1988, pages 4696 to 4711). In a case where the degree of squeezing $G_S$ is sufficiently large, the amplitude fluctuations of pumping light do not have a serious influence on a digital It is the phase fluctuations of the pumping light which produce a serious effect on the digital signal. In the above-mentioned system, the phase fluctuations of pumping light are suppressed by the SHG, and thus the output light from a squeezer is able to have the characteristics of FIG. 5. In FIG. 5, a symbol $G_S$ is considered to be a minimum one of values indicative of the degree of squeezing.

When the phase angle of a lightwave of a local oscillator used in an optical homodyne receiver is set to zero, the optical receiver detects only the cosine component of the signal lightwave (that is, $X_{C(out)}$ and $\Delta X^2_{C(out)}$), as described in Chapter 6 of the reference 1.

The decision of the received signal by the optical homodyne receiver is in the following manner. The noise in the received signal resulting from a transmitted signal having a logical value "1" (that is, the phase angle $\phi_S$ equal to zero) and the noise in the received signal resulting from the transmitted signal having a logical value "0" (that is, the phase angle $\phi_S$ equal to $\pi/2$ radian) are distributed as shown in FIG. 6. Accordingly, two threshold values $+X_{TH}$ and $-X_{TH}$ are set as shown in FIG. 6. When the output of the optical receiver lies in a range from $-X_{TH}$ to $+X_{TH}$, it is judged that the transmitted signal has the logical value "0". When the output of the optical receiver lies on the outside of the above range, it is judged that the transmitted signal has the logical value "1". In this case, the bit error rate $P_e$ is expressed as follows:

$$P_e(0|1) \simeq \frac{1}{\sqrt{2\pi \frac{G_S}{4}}} \exp[-2\eta \, E_R^2] \cdot 19 \, 2X_{TH} \quad (7)$$

$$P_e(1|0) = 2 \int_{-\infty}^{-X_{TH}} \frac{1}{\sqrt{2\pi \frac{G_S}{4}}} \exp\left[-\frac{X_{TH}^2}{2 \cdot \frac{1}{4G_S}}\right] dx \quad (8)$$

$$= 2 \, \text{erfc}[\sqrt{(X_{TH})^2/(1/4G_S)}\,]$$

where a sign erfc indicates an error function, and $X_{TH}$ is obtained by solving the following equation, in which the number of received photons $\eta E_R^2$ is fixed;

$$2X_{TH} \cdot \exp[-2\eta \, E_R^2] = \text{erfc}[\sqrt{4E_R^2}\,]$$

It is to be noted that the right-hand side of this equation indicates the bit error rate characteristics of a conventional optical PSK system. Thus, the equation (7) is rewritten as follows:

$$P_e(0|1) = \frac{1}{\sqrt{2\pi G_S/4}} \, \text{erfc}(\sqrt{4E_R^2}\,) \quad (10)$$

$$\approx 0, \, G_S \to \infty$$

While, the bit error rate $P_e(1|0)$ is rewritten as follows:

$$P_e(1|0) \approx 0, \, G_S \to \infty \quad (11)$$

As is evident from the above, we can obtain an optical communication system which is far superior in reliability to the conventional optical PSK system, by making the degree of squeezing $G_S$ sufficiently large. FIG. 7 shows the theoretical value of relative error rate H (that is, a ratio of the bit error rate according to the present invention to the bit error rate in the conventional optical PSK homodyne detection). It is to be noted that FIG. 7 is formed by using parameters $E_R^2 = <n_R> = 9$ and $G_{S(th)} = 5270$. Further, FIG. 7 shows that when a ratio $K = G_S/G_{S(th)}$ is made larger than 1 (one), the error rate becomes smaller than a conventional value, that is, the relative error rate H becomes smaller than 1 (one).

Further, when the signal lightwave of FIG. 8 is directly incident on an optical homodyne receiver, noise of the signal lightwave will be distribute as shown in FIG. 9. The best bit error rate is obtained by setting a threshold value $y_{TH}$ at the intersection of the probability density curve of the transmitted signal having the logical value "1" and the probability density curve of the transmitted signal having the logical value "0". Such a conventional detection method, however, cannot improve the error rate, that is, cannot make the relative error rate H smaller than 1 (one).

As can be seen from the above, the present invention has the following advantages.

(1) When the intensity of a signal lightwave and a bit rate are made equal to those in a conventional coherent optical communication system, the bit error rate in a received signal can be made smaller than an ordinary value.

(2) When a bit rate and the bit error rate in a received signal are made equal to those in the conventional communication system, a receiving sensitivity is improved, and thus a transmission line for communication is allowed to have more loss than usual, that is, a transmission distance can be increased.

(3) When the bit error rate in a received signal and the intensity of the signal lightwave are made equal to those in the conventional communication system, a bit rate can be made higher than an ordinary value.

(4) When a bit rate and the bit error rate in a received signal are made equal to those in the conventional communication system, signal lightwave can be separated into a plurality of beams, and thus a plurality of optical receivers or detectors can receive the signal lightwave at the same time.

BRIEF DESCRIPTION THE DRAWINGS

DESCRIPTION OF THE PREFERRED EMBODIMENTS

Figure 1:
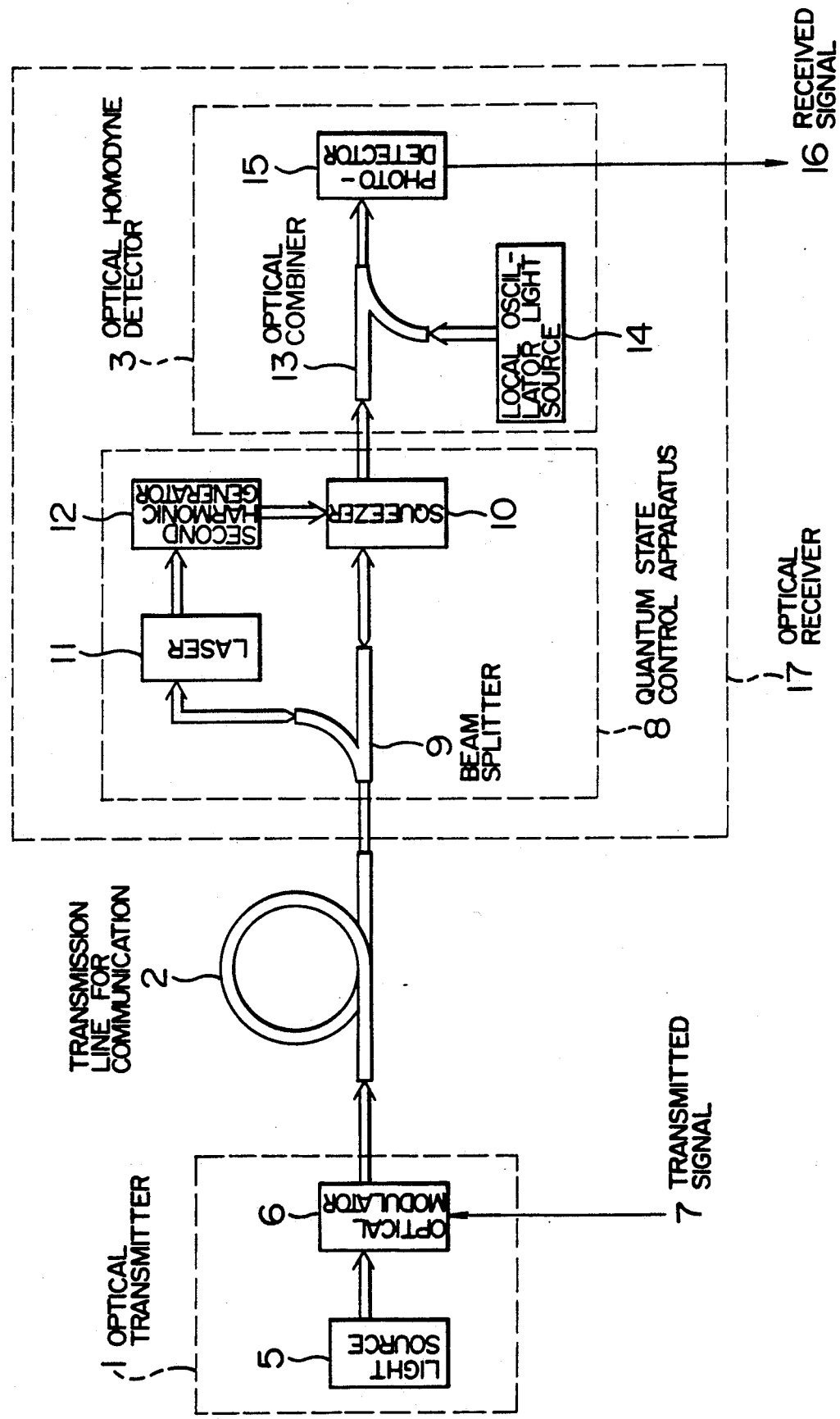
FIG. 1 is a block diagram showing an embodiment of the present invention.

Now, explanation will be made of an embodiment of each of an optical receiver, a quantum state control apparatus and an optical communication system which are all constructed in accordance with the present invention, with reference to FIG. 1. In FIG. 1, reference numeral 1 designates an optical transmitter, and 5 a light source. The light source 5 is formed of, for example, a laser having a single lasing mode such as a distributed feedback (DFB) semiconductor laser, a distributed Bragg reflector (DBR) semiconductor laser, a semiconductor laser provided with an external cavity, and a gas laser. Reference numeral 6 in FIG. 1 designates an optical modulator, which is driven by a transmitted signal 7. In order to obtain a PSK signal lightwave, a phase modulator is used as the optical modulator 6. The phase modulator can be formed by using a lithium niobate ($LiNbO_3$) crystal, which is available on the market. The phase modulator 6 carries out phase shift keying (PSK) for light which is emitted from the light source 5 and put in a coherent state, in such a manner that the phase angle of the light is set to zero or $\pi/2$ radian.

Reference numeral 2 in FIG. 1 designates a transmission line for propagating a signal lightwave to serve as a communication line. The transmission line 2 can be formed of, for example, an optical fiber. Alternatively, the transmission line 2 may be a space.

Figure 2:
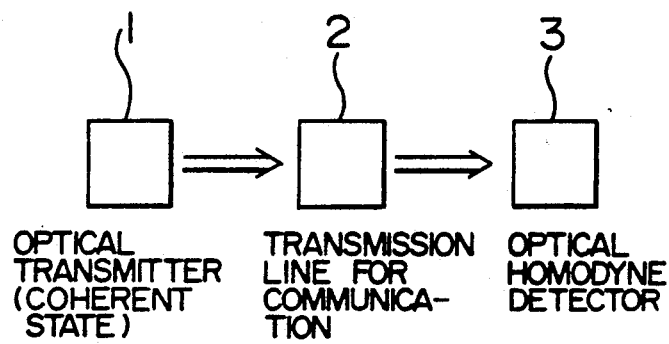
FIG. 2 is a block diagram showing a conventional coherent optical communication system.
Figure 3:
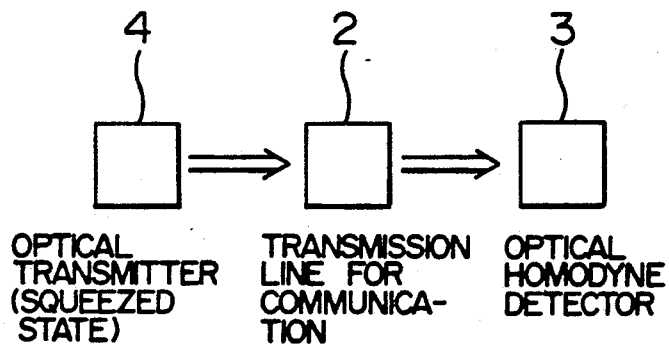
FIG. 3 is a block diagram showing an example of a conventional communication system utilizing a quantum state control technique.
Figure 4:
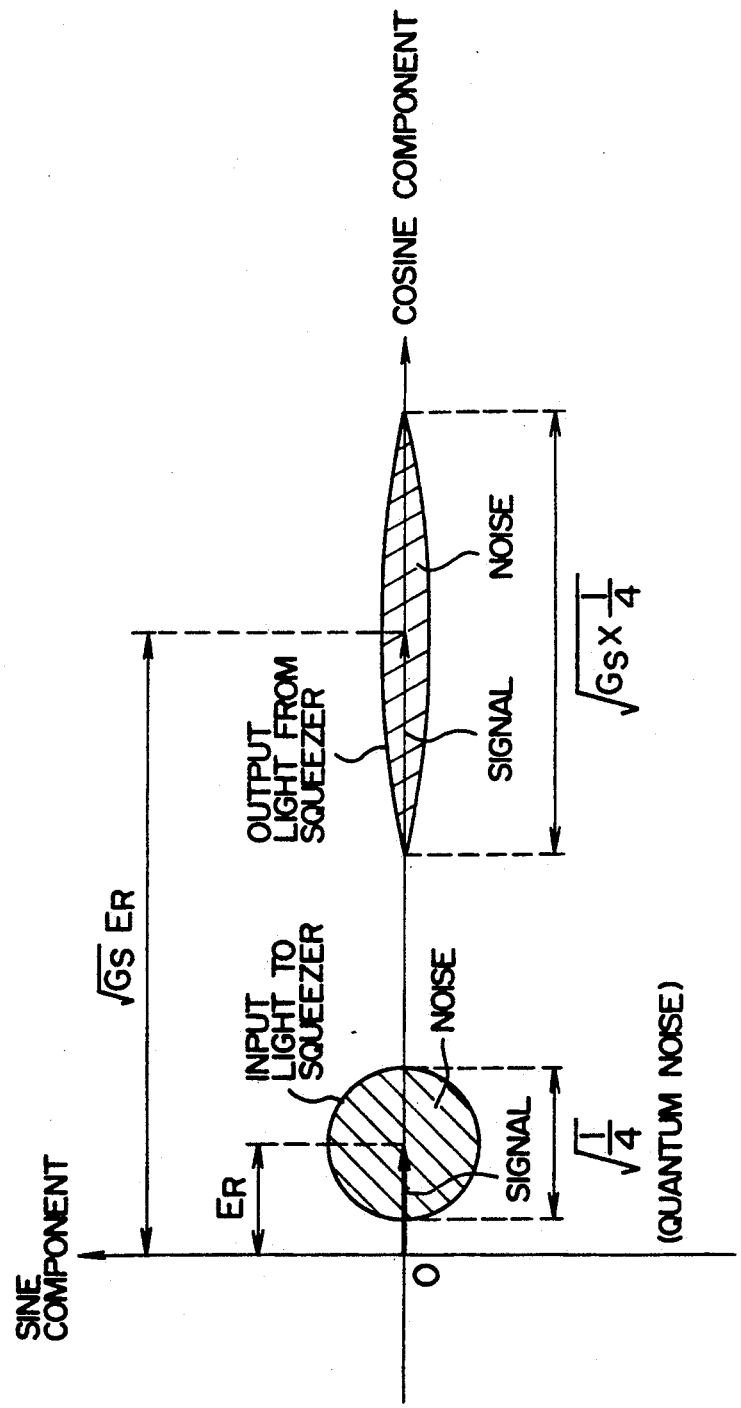
FIG. 4 is a schematic diagram showing a relation between the signal and the noise, in each of input light to and output light from a squeezer

Further, in FIG. 1, reference numeral 8 designates a quantum state control apparatus according to the present invention, and 9 a beam splitter for separating output light from the transmission line into two beams. The beam splitter 9 can be formed of, for example, an optical coupler or half-mirror on the market. Reference numeral 10 in FIG. 1 designates an apparatus (namely, squeezer) for changing the quantum state of a signal lightwave emerging from the beam splitter 9, from the coherent state to a squeezed state. The squeezer 10 has a power amplification factor G, and can be formed by utilizing degenerate parametric amplification, degenerate four-wave mixing, or other methods known in the art. The squeezer based upon degenerate parametric amplification is described on pages 2520 to 2523 (specifically, in FIG. 2) of Phys. Rev. Lett., Vol. 57, No. 20, 1986. Further, the squeezer based upon degenerate four-wave mixing is described on pages 48 to 58 (specifically, in the figure on page 51) of the "SAIENSU (Sience)" published by Nikkei Saiensu Co., Vol. 18, No. 7, 1988.

Reference numeral 11 designates a laser in a highly-excited state and used for pumping the squeezer 10. The laser 11 is put in an injection locking state by signal lightwave outputted from the beam splitter 9. Reference numeral 12 designates a second-harmonic generator for light. The second-harmonic generator 12 doubles the frequency of output light from the laser 11, and can be formed by using a material with optically nonlinear characteristics. The output of the second-harmonic generator 12 is used as the pumping light source for the squeezer 10. The second-harmonic generator 12 also doubles the phase angle $\phi_S$ of the output light of the laser 11. Accordingly, when the transmitted signal has a logical value "1" (that is, $\phi_S = 0$ radian), the phase angle of the output light of the second harmonic generator 12 is equal to 0 radian. When the transmitted signal has a logical value "0" (that is, $\phi_S = \pi/2$ radian), the phase angle of the output light of the second-harmonic generator 12 is equal to $\pi$ radian. Thus, when the transmitted signal has the logical value "1", the squeezer 10 amplifies the cosine component of the signal lightwave. When the transmitted signal has the logical value "0", the squeezer 10 amplifies the sine component of the signal lightwave. As a result, the quantum state control apparatus 8 converts a signal lightwave from the coherent state of FIG. 8, into signal lightwave which is put in the squeezed state of FIG. 5.

The signal lightwave outputted from the squeezer 10 is used as the output of the quantum state control apparatus 8.

Reference numeral 3 designates an optical homodyne detector. The signal lightwave outputted from the quantum state control apparatus 8 is combined, by an optical combiner 13 such as an optical coupler, with the local lightwave from a local oscillator light source 14. Like the light source 5, the local oscillator light source 14 is formed of a laser having a single lasing mode. The signal lightwave from the apparatus 8 and the local lightwave are combined with each other in a state that the local lightwave is substantially equal in state of polarization and phase to the signal lightwave. Reference numeral 15 designates a photo-detector. The photo-detector 15 produces and delivers a received signal 16 which is substantially the same as the transmitted signal. The photo-detector 15 includes at least a photo-diode (PD), and may further include various circuits used in an ordinary optical receiver such as an amplifier and a filter.

Reference numeral 17 in FIG. 1 designates an optical receiver according to the present invention, the optical receiver 17 includes at least the quantum state control apparatus 8 and the optical homodyne detector 3. Further, an optical communication system according to the present invention includes at least the optical transmitter 1, the transmission line 2 for communication, and the optical receiver 17.

Figure 5:
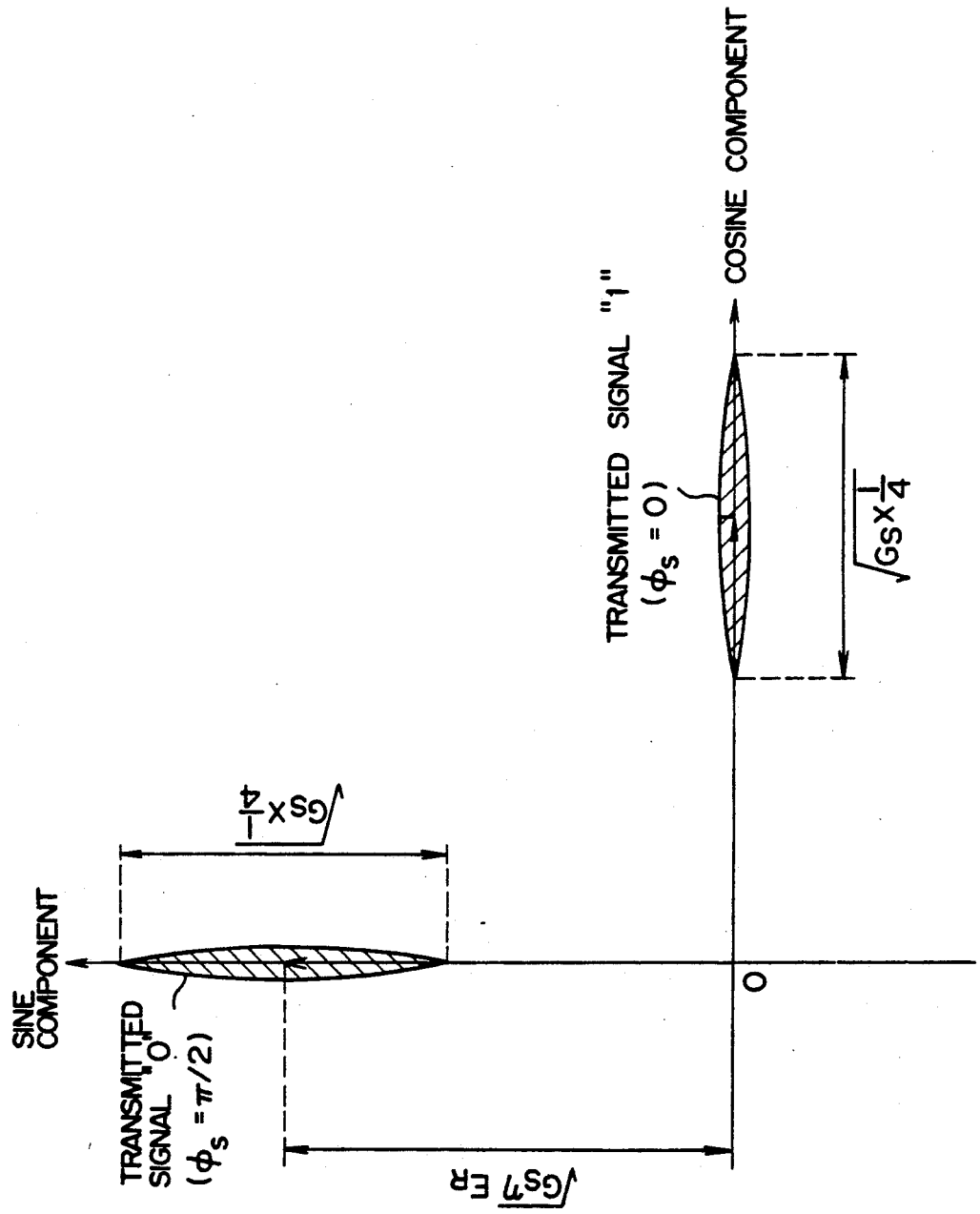
FIG. 5 is a schematic diagram showing relations between the signal and the noise, in light outputted from a quantum state control apparatus according to the present invention.
Figure 6:
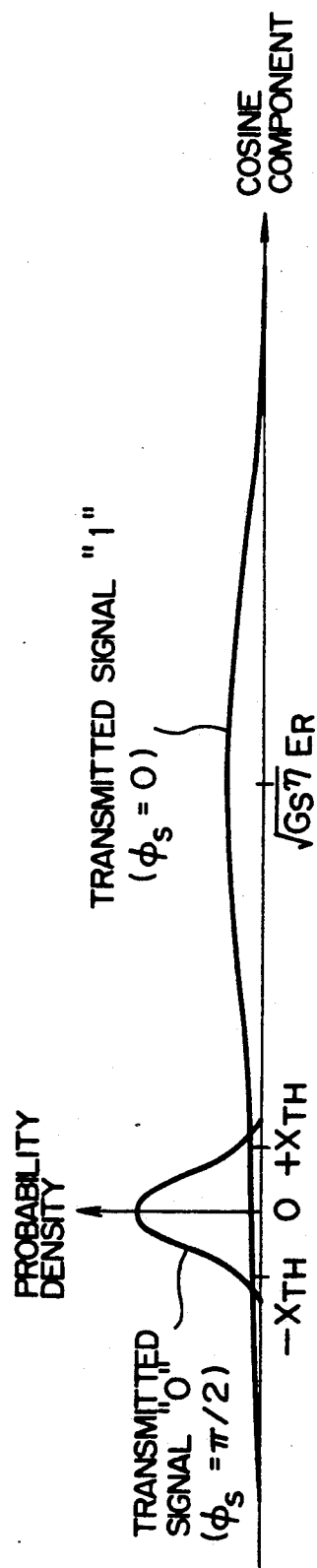
FIG. 6 is a schematic diagram showing noise distribution characteristics according to the present invention.
Figure 7:
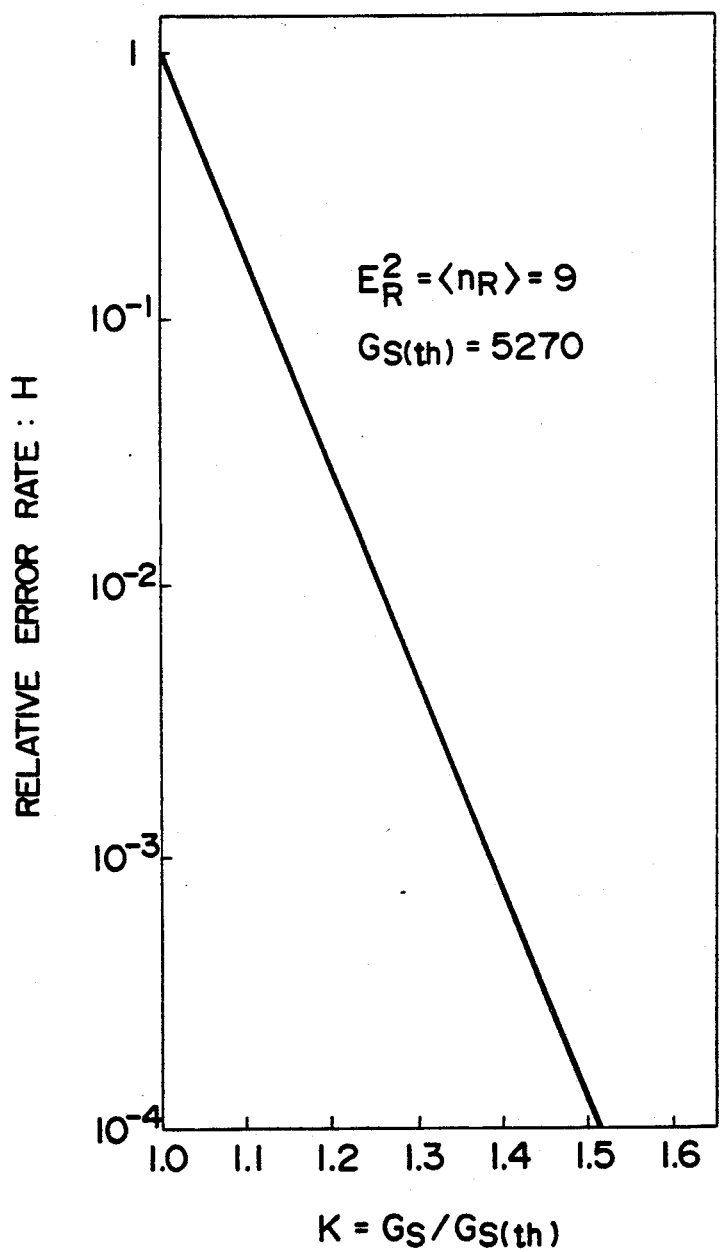
FIG. 7 is a graph showing a relative error rate (namely, a ratio of the bit error rate according to the present invention to the bit error rate in conventional optical PSK homodyne detection).
Figure 8:
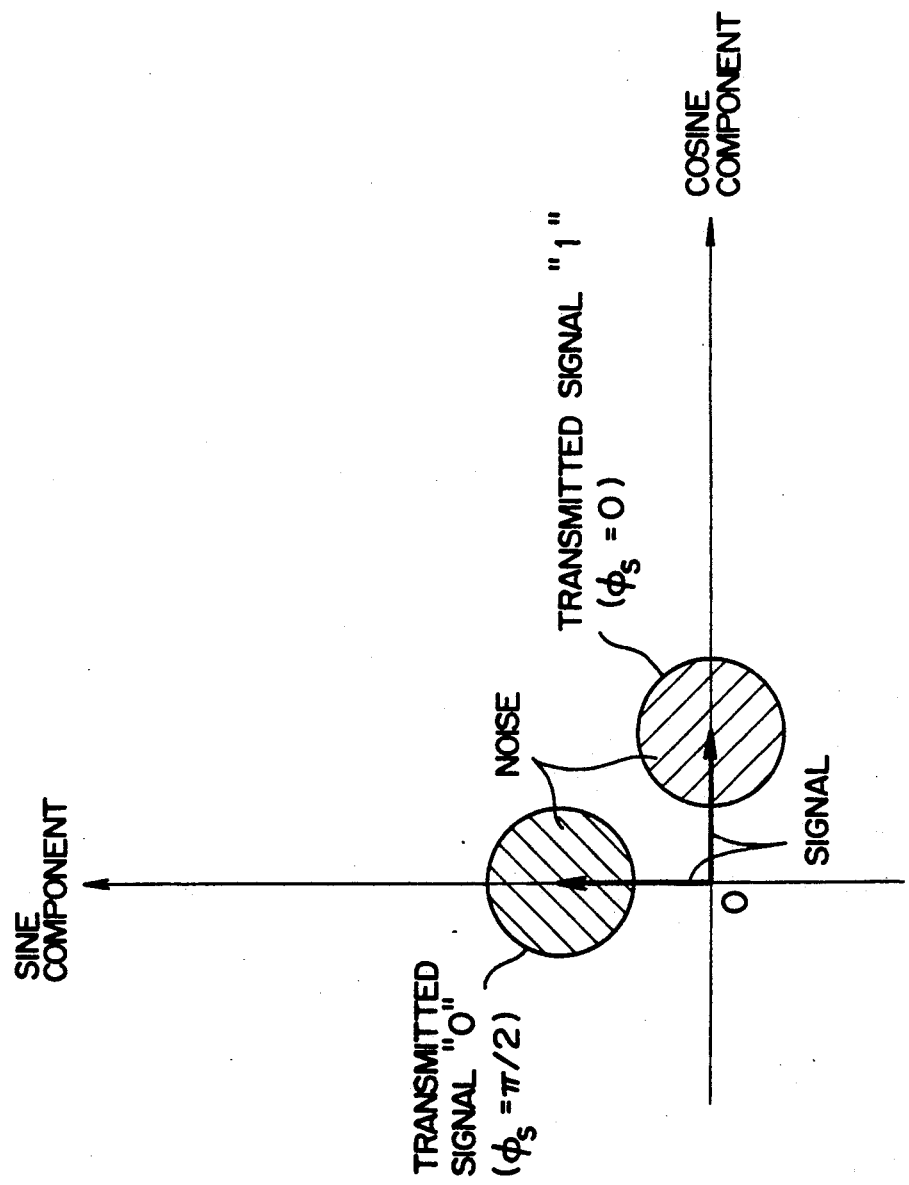
FIG. 8 is a schematic diagram showing relations between the signal and the noise, in light incident on a quantum state control apparatus according to the present invention.
Figure 9:
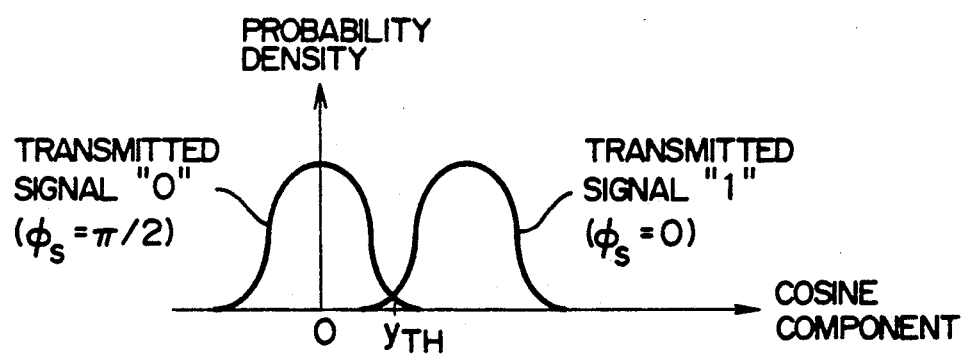
FIG. 9 is a schematic diagram showing noise distribution characteristics according to a conventional method.

According to the present embodiment shown in FIG. 1, the input light having the quantum state of FIG. 8 is converted by the quantum state control apparatus into the output light having the quantum state of FIG. 5, and the output signal of the optical homodyne detector supplied with the output light of the quantum state control apparatus has the noise distribution shown in FIG. 6. Accordingly, when threshold values $\pm X_{TH}$ are set as shown in FIG. 6, and it is decided whether or not the output signal lies in a range from $-X_{TH}$ to $+X_{TH}$, the logical value "0" or "1" of the transmitted signal can be determined, and the bit error rate is improved as shown in FIG. 7. That is, by using the quantum state control apparatus, an optical receiver and an optical communication system can be obtained which are superior in bit error rate characteristics to a conventional optical receiver and a conventional optical communication system.

As mentioned above, the above quantum state control apparatus according to the present invention can improve bit error rate characteristics in received light.

Further, the above optical receiver according to the present invention and the above optical communication system according to the present invention are both provided with the inventive quantum state control apparatus which can improve bit error rate characteristics in received light. Hence, the optical receiver and the optical communication system can produce the following effects.

(1) When the intensity of a signal lightwave and a bit rate are made equal to those in a conventional coherent optical communication system, the bit error rate in a received signal can be made smaller than an ordinary value.

(2) When a bit rate and the bit error rate in a received signal are made equal to those in the conventional communication system, a receiving sensitivity is improved, and thus a transmission line for communication is allowed to have more loss than usual, that is, a transmission distance can be elongated.

(3) When the bit error rate in a received signal and the intensity of a signal lightwave are made equal to those in the conventional communication system, a bit rate can be made higher than an ordinary value.

(4) When a bit rate and the bit error rate in a received signal are made equal to those in the conventional communication system, signal lightwave can be separated into a plurality of beams, and thus a plurality of optical receivers or detectors can receive the signal lightwave at the same time.

In order to attain the first object, according to another aspect of the present invention, there is provided an optical receiver which includes an apparatus (namely, squeezer) for changing the quantum state of a signal lightwave to a squeezed state, a slave laser put in an injection locking state by a signal lightwave from the squeezer, and an optical homodyne detector for carrying out optical homodyne detection for a signal lightwave from the slave laser.

Now, explanation will be made of a case where light emitted from the light source of an optical transmitter is put in a coherent state, and a PSK (phase shift keying) signal due to the cosine component of light is used as signal lightwave, by way of example. It is to be noted that an ASK (amplitude shift keying) signal due to the cosine component of light can produce the same effect as obtained by the PSK signal. When coherent light is propagated through a transmission line used as a communication line having an energy loss, the output light from the transmission line is also in the coherent state. When the output light is directly detected, the signal-to-noise ratio of an output signal is equal to $4<n_R>$, where $<n_R>$ indicates the number of photons included in a single optical signal pulse outputted from the transmission line. The above value of signal-to-noise ratio is usually called "shot noise limit".

Figure 11:
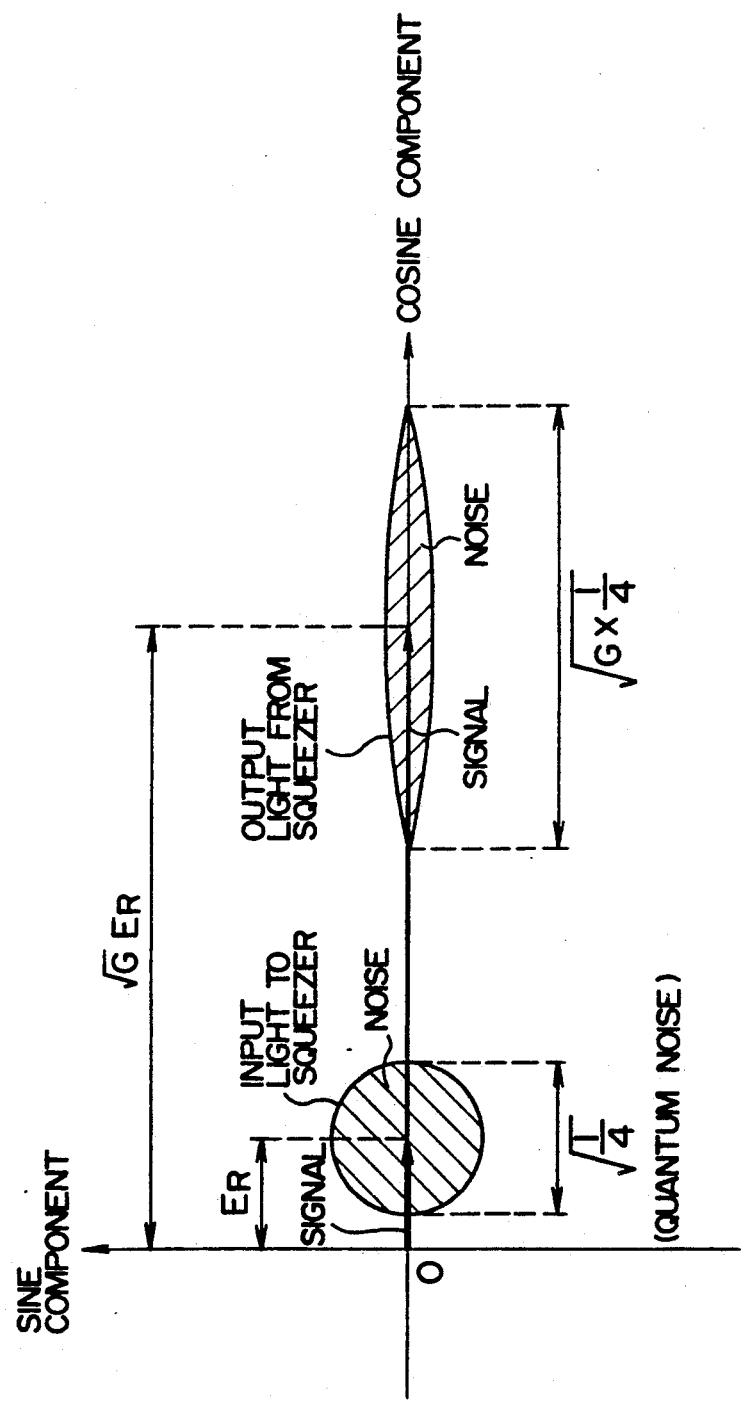
FIG. 11 is a schematic diagram showing a relation between the signal and the noise, in each of input signal lightwave to and output signal lightwave from a squeezer.

According to the present invention, light which is outputted from the transmission line for communication and put in the coherent state, is converted by the squeezer into light which is put in a squeezed state. The cosine component of the output light of the squeezer is G times larger in both signal and quantum noise than the cosine component of the input light to the squeezer. On the other hand, the signal and quantum noise of the sine component of the output light are reduced to 1/G of those of the sine component of the input light. Although the cosine component of the output light is used as an information signal, the signal-to-noise ratio in the cosine component of the output light is equal to that in the cosine component of the input light, that is, $4<n_R>$. FIG. 11 shows relations between a signal (indicated by an arrow) and noise (indicated by hatching). In FIG. 11, the abscissa of an orthogonal coordinate system indicates the amplitude of the cosine component of the electric field of signal lightwave, and the ordinate the amplitude of the sine component. Further, $E_R$ indicates the amplitude of the cosine component of the electric field of the input light to the squeezer, and is equal to $\sqrt{<n_R>}$. Next, let us construct an injection locking system, in which the output light of the squeezer is used as injected signal lightwave. Now, let us express the amplitude, angular frequency and phase of an electric field by E, $\omega$ and $\phi$, respectively. When light is not injected into the slave laser, the slave laser makes self-oscillation with an output $E_o \cos(\omega_o t + \phi_o)$. When light having an electric field $E_i \cos(\omega_i t + \phi_i)$ is injected into the slave laser, the slave laser is operated in synchronism with the injected light, and the output $E_l \cos(\omega_i t + \phi_i)$ of the slave laser is equal in angular frequency and phase to the injected light. The principle of injection locking is described in detail in Chapter 4 (in more detail, pages 156 to 159) of the reference 1.

Now, explanation will be made of a theory about the quantum noise characteristics of an optical injection locking system. In order to simplify theoretical formulae, let us assume that $E_i<<E_o$ and $\omega_i=\omega_o$. In this case, the amplitude $E_l$ is nearly equal to $E_o$ (that is, $E_l \approx E_o$). Analysis will be made on the above assumption.

The quantum fluctuation characteristics in the output of an injection locked laser are usually explained by using a theory for analyzing the photon coherent characteristics of a laser beam. Fluctuations in the number of photons included in the laser beam (namely, photon-number fluctuations) are generally expressed by the following equation:

$$\Delta n^2 = E^2[1 + hE^2]$$

where h is a parameter for indicating excess noise relative to an ideal laser beam. That is, h=0 corresponds to the ideal laser beam, and h=1 corresponds to noise light. When a laser is put in an injection locking state, the excess noise in the output light of the laser results from the photon-number fluctuations in injected light and phase fluctuations. The phase fluctuations are the sum of phase fluctuations in the injected light and phase fluctuations in the slave laser. As a result, the photon-number fluctuations and phase fluctuations in the output light of the laser put in an injection locking state are given by the following equations:

$$\Delta n_l^2 = E_o^2[1 + (\alpha+\beta)E_o^2] \quad (1)$$

$$\Delta \phi_l^2 = \Delta\phi_{in}^2 + \Delta\phi_o^2 \quad (2)$$

where $\alpha$ is a parameter for indicating excess fluctuations due to the photon-number fluctuations in injected light, $\beta$ is a parameter for indicating excess fluctuations due to the phase fluctuations in injected light, $\Delta\phi^2_{in}$ indicates the phase fluctuations in injected light, and $\Delta\phi^2_o$ indicates the phase fluctuations in the self oscillation of the slave laser. An equation $(\alpha+\beta)=1$ corresponds to a fact that the output light of the laser put in the injection locking state is noise-like light, and an equation $(\alpha+\beta)=0$ corresponds to a fact that coherent light is emitted from the above laser. When the slave laser is put in the injection locking state and moreover operated in a highly-excited state, the parameter $\beta$ in the equation (1) is considered to be zero. However, the parameter $\beta$ is not suppressed, since the phase fluctuations in injected light have a direct influence on the parameter $\beta$. Thus, the parameter $\beta$ is nearly equal to $\Delta\phi^2_{in}$ (that is, $\beta \approx \Delta\phi_{in}$). When the equations (1) and (2) are determined, the quantum noise in the cosine component of the output light of the laser which is put in the injection locking state, is given as follows:

$$\Delta E_{lc}^2 = \frac{\Delta n_l^2}{4E_l^2} \approx \frac{\Delta n_l^2}{4E_o^2} \quad (3)$$

The noise characteristics of the injection locking system, in which the output light of the squeezer is used as injected light, will be explained below, by using the above theory.

The signal amplitude $E_R$ of the output of the transmission line for communication becomes $\sqrt{G} E_R$ on the output side of the squeezer, and the amplitude $\sqrt{G} E_R$ is used as $E_i$. The quantum noise in the cosine component is amplified by a factor of G, and the quantum noise in the sine component is reduced to 1/G of an input value. This corresponds to a phenomenon that photon-number fluctuations in the cosine component become very large, and phase fluctuations are reduced. When such light is injected into the slave laser to put the slave laser in an injection locking state, the quantum noise in the cosine component of the output light of the slave laser can be determined from the equations (1) to (3), and is given by the following equation:

$$\Delta E_{lC}^2 = \frac{1}{4}\left[1 + \frac{E_o^2}{G^2 E_R^2}\right] \quad (4)$$

When only the cosine component of the output light having the above quantum noise is detected by an optical homodyne detector, a signal-to-noise ratio $SNR_{IC}$ is obtained which is given by the following equation:

$$SNR_{lc} = \frac{4E_o^2}{1 + \frac{1}{G^2} \cdot \frac{E_o^2}{E_R^2}} = \frac{4<n_0>}{1 + \frac{1}{G^2} \cdot \frac{<n_0>}{<n_R>}} \quad (5)$$

where $<n_0>=E_o^2$ and $<n_R>=E_R^2$ The signal-to-noise ratio $SNR_R$ of the output light of the optical fiber (that is, transmission line) is $4<n_R>$. Hence, the improvement ratio of signal-to-noise ratio ($\Delta SNR$) according to the present invention is given by the following equation:

$$\Delta SNR = \frac{SNR_{IC}}{SNR_R} = \left( \frac{<n_R>}{<n_0>} + \frac{1}{G^2} \right)^{-1} \quad (6)$$

where $$G > (1 - <n_R>/<n_0>)^{-\frac{1}{2}} \simeq 1 \quad (7)$$

Figure 16:
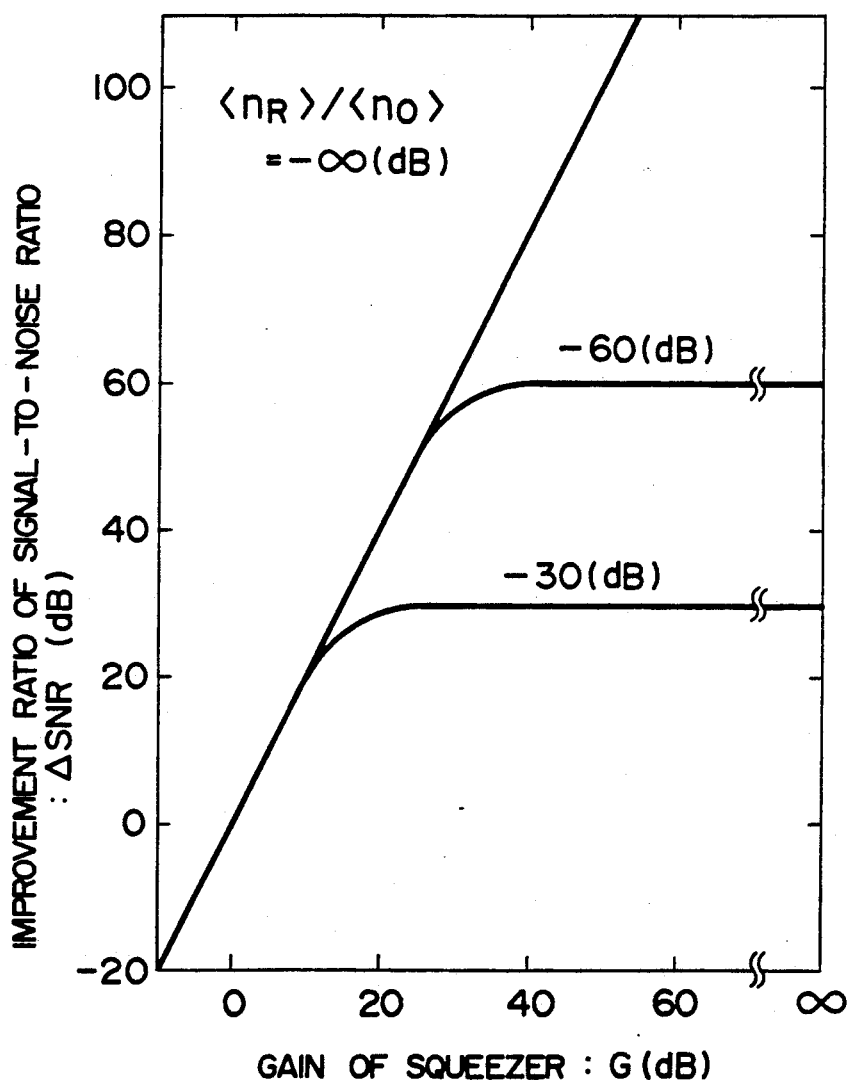
FIG. 16 is a graph showing the improvement of signal-to-noise ratio of output light from the slave laser.

The formula (7) shows a condition for making the $\Delta SNR$ of the equation (6) larger than 0 (dB), that is, a condition for improving a signal-to-noise ratio by the present invention. In an ordinary case, a relation $1 >> <n_R>/<n_0>$ is satisfied, and hence the right-hand side of the formula (7) is nearly equal to 1 (=0 dB). FIG. 16 shows relations between the gain G (dB) of the squeezer and the improvement ratio $\Delta SNR$ (dB) of signal-to-noise ratio, and these relations are determined from the equation (6). In FIG. 16, a ratio $<n_R>/<n_0>$ (dB) is used as a parameter. In a case where the ratio $<n_R>/<n_0>$ is equal to $-\infty$ (dB), the improvement ratio $\Delta SNR$ is proportional to the square of the gain G. While, in a case where the ratio $<n_R>/<n_0>$ is greater than $-\infty$ (dB), the improvement ratio $\Delta SNR$ is proportional to the square of the gain G for small values of G, and approaches to a ratio $<n_0>/<n_R>$ as the gain G is larger. For example, in a case where the ratio $<n_R>/<n_0>$ is equal to $-60$ (dB), the improvement ratio $\Delta SNR$ approaches to 60 (dB) as the gain G is larger.

Figure 10:
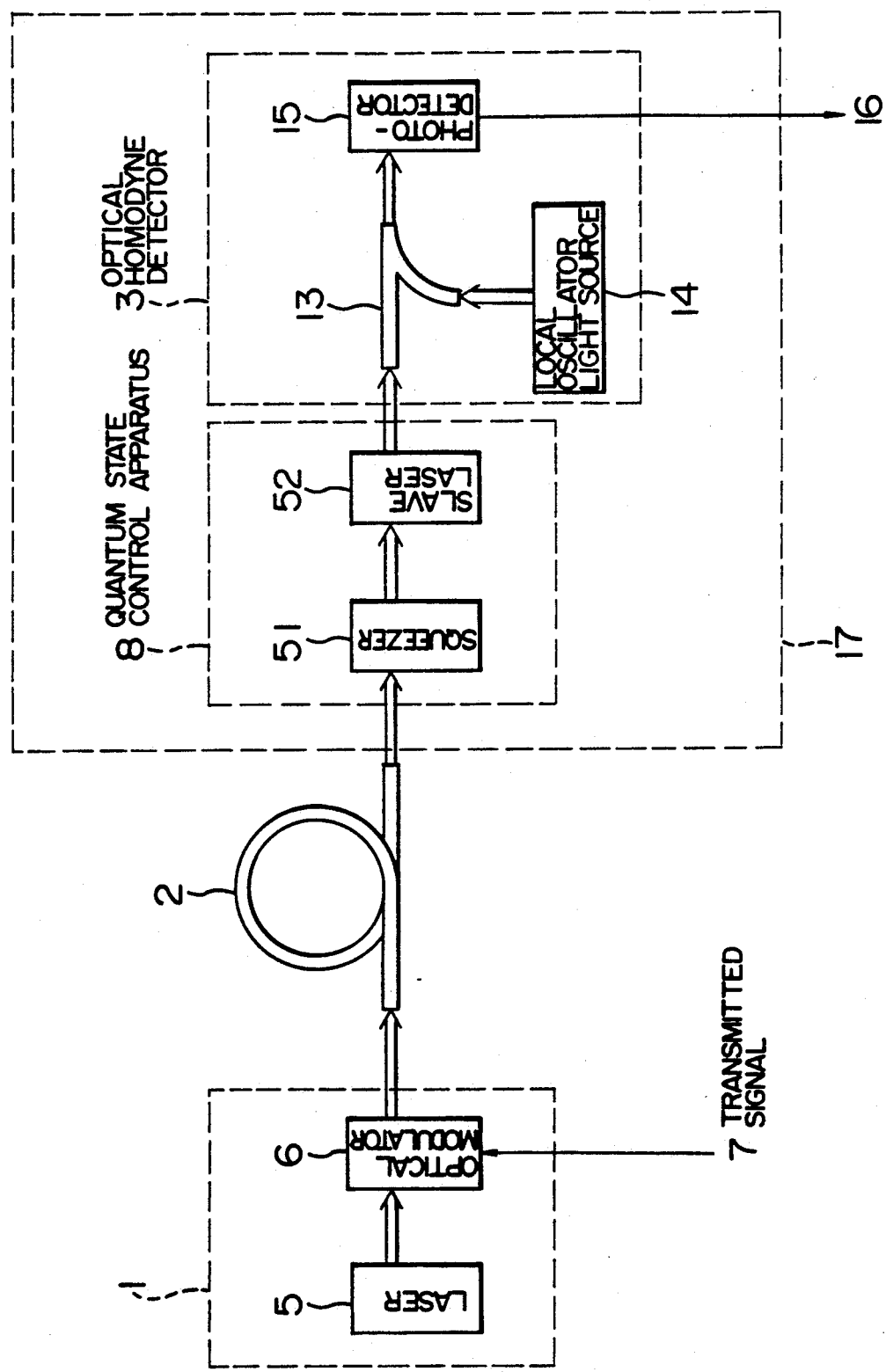
FIG. 10 is a block diagram showing other embodiments of each of a quantum state control apparatus, an optical receiver an optical detector and an optical communication system which utilize the quantum state control.

Now, explanation will be made of another embodiment of each of an optical receiver, an optical detector, a quantum state control apparatus and an optical communication system which are all constructed in accordance with the present invention, with reference to FIG. 10. In FIG. 10, reference numeral 1 designates an optical transmitter, and 5 a light source. The light source 5 is formed of, for example, a laser having a single lasing mode such as a distributed feedback (DFB) semiconductor laser, a distributed Bragg reflector (DBR) semiconductor laser, a semiconductor laser provided with an external cavity, and a gas laser. Reference numeral 6 designates an optical modulator, which is driven by a transmitted signal 7. In a case a where PSK signal lightwave is produced, a phase modulator is used as the optical modulator 6. The phase modulator can be formed by using a lithium niobate (LiNbO₃) crystal, which is available on the market. The phase modulator 6 carries out phase shift keying (PSK) for light which is emitted from the light source 5 and put in a coherent state, in such a manner that the phase angle of the light is set to zero or $\pi$ radian. In a case where an ASK signal lightwave is produced, an optical switch or light intensity modulator is used as the optical modulator 6. In this case, light emitted from the light source 5 is subjected to an ON-OFF control (that is, the light is transmitted or cut off), or the intensity of the light is changed from one of two values to the other value in accordance with the state of the transmitted signal 7.

Reference numeral 2 designates a transmission line for propagating signal lightwave to serve as a communication line. The transmission line 2 can be formed of, for example, an optical fiber, or may be a space.

Further, in FIG. 10, reference numeral 8 designates a quantum state control apparatus according to the present invention, and 51 an apparatus (namely, squeezer) for changing the quantum state of light outputted from the transmission line 2, from the coherent state to a squeezed state. The squeezer 51 has a power amplification factor G, and can be formed by utilizing degenerate parametric amplification, degenerate four-wave mixing, or others. The squeezer based upon degenerate parametric amplification is described on pages 2520 to 2523 (specifically, in FIG. 2) of Phys. Review Lett., Vol. 57, No. 20, 1986. Further, the squeezer based upon degenerate four-wave mixing is described on pages 48 to 58 (specifically, in the figure on page 51) of the "SAIENSU (Science)" published by Nikkei Saiensu Co., Vol. 18, No. 7, 1988. Reference numeral 52 in FIG. 10 designates a slave laser in a highly-excited state. Like the light source 5, the slave laser 52 is formed of a laser having a single lasing mode. The signal lightwave outputted from the squeezer 51 is injected into the slave laser 52, to put the slave laser 52 in an injection locking state. The signal light outputted from the slave laser 52 is used as the output of the quantum state control apparatus 8.

Reference numeral 3 designates an optical homodyne detector. The signal lightwave outputted from the quantum state control apparatus 8 is combined with the local lightwave outputted from a local oscillator light source 14, by means of an optical combiner 13 such as an optical coupler. Like the light source 5, the local oscillator light source 14 is formed of a laser having a single lasing mode. The signal lightwave from the apparatus 8 is combined with the local lightwave in a state that the local lightwave is substantially equal in state of polarization and phase to the signal lightwave. Reference numeral 15 designates a photo-detector. The photo-detector 15 produces and delivers a received signal 16 which is substantially the same as the transmitted signal. The photo-detector 15 includes at least a photo-diode (PD), and may further include various circuits used in an ordinary optical receiver such as an amplifier and a filter.

Reference numeral 17 designates an optical receiver or detector according to the present invention. The optical receiver 17 includes at least the quantum state control apparatus 8 and the optical homodyne detector 3. Further, an optical communication system according to the present invention includes at least the optical transmitter 1, the transmission line 2 for communication, and the optical receiver 17.

Figure 17A:
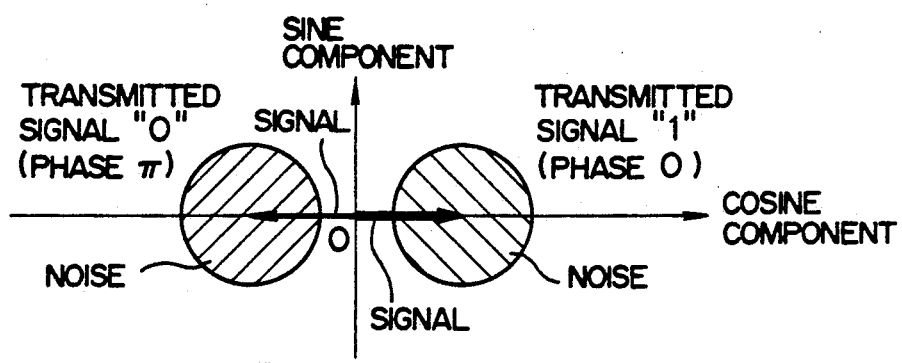
FIGS. 17A, 17B and 17C are schematic diagrams showing relations between a signal and noise, and showing noise distribution characteristics.
Figure 17B:
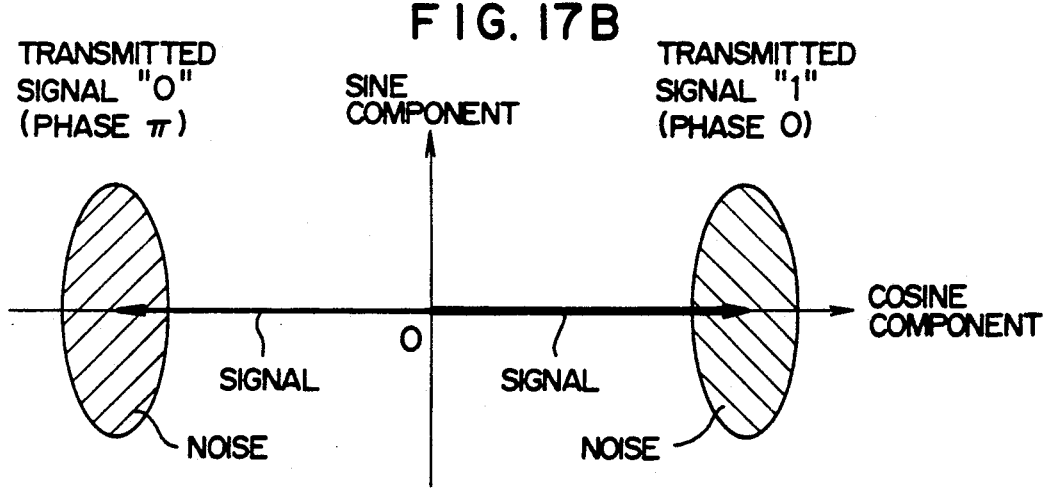
Figure 17C:
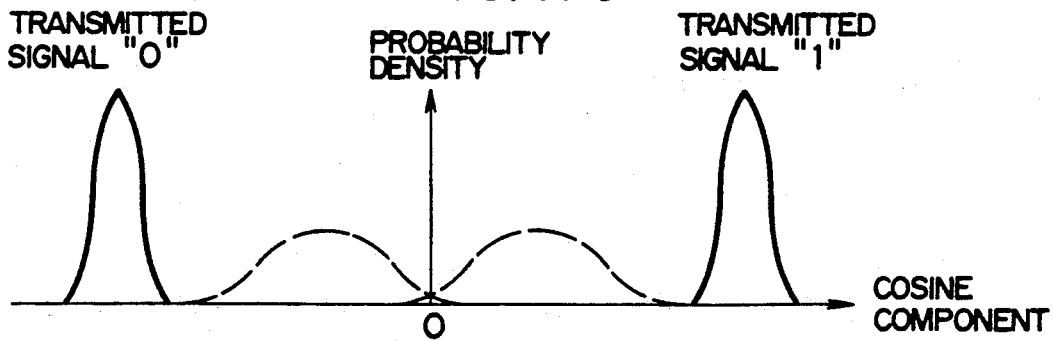

Now, explanation will be made of the improvement of signal-to-noise ratio in a case where PSK signal lightwave is used, with reference to FIGS. 17A to 17C. The PSK signal lightwave is produced in such a manner that the phase angle of light is set to zero radian for the logical value "1" of a transmitted signal, and is set to $\pi$ radian for the logical value "0" of the transmitted signal. When such PSK signal lightwave is transmitted, optical signal shown in FIG. 17A is incident on the optical receiver. In FIG. 17A, abscissa indicates the amplitude of the cosine component of signal lightwave, and ordinate the amplitude of the sine component of signal lightwave. In a case where the signal lightwave corresponding to the logical value "1" of the transmitted signal (namely, the signal lightwave having a phase angle of zero) is incident on the optical receiver, the signal component of the signal lightwave is indicated by an arrow directed to the right, in FIG. 17A, and the noise component is indicated by slant lines. While, in a case where the signal lightwave corresponding to the logical value "0" of the transmitted signal (namely, signal lightwave having a phase angle of $\pi$ radiation) is incident on the optical receiver, the signal component of the signal lightwave is indicated by an arrow directed to the left, and the noise component is indicated by slant lines. In a conventional method, such a signal lightwave is supplied directly to an optical homodyne detector. According to the present invention, the signal lightwave is supplied to the above-mentioned quantum state control apparatus, and the output light thereof (that is, light shown in FIG. 17B) is supplied to the optical homodyne detector. As shown in FIG. 17B, the signal component of signal lightwave corresponding to each of the logical values "1" and "0" is amplified by a factor of $\sqrt{G}$ while, the cosine component of noise is amplified by a factor less than $\sqrt{G}$. That is, the signal-to-noise ratio of the signal lightwave shown in FIG. 17B is superior to that of the signal lightwave shown in FIG. 17A. Accordingly, the probability density of a signal which is obtained by carrying out optical homodyne detection for the signal lightwave of FIG. 17B, is indicated by solid curves in FIG. 17C. When a threshold value is set at a zero-position in FIG. 17C, it is possible to decide between logical values "1" and "0" with high accuracy (that is, with excellent bit error rate characteristics). In contrast, the probability density of a signal which is obtained by carrying out optical homodyne detection for the signal lightwave of FIG. 17A, is indicated by the lines in FIG. 17C. Therefore, using the light of FIG. 17B, the probability that the signal corresponding to the logical value "1" or "0" becomes smaller or larger than the threshold value equal to zero, is increased. In other words, the bit error rate is decreased.

Accordingly, the quantum state control apparatus according to the present embodiment has an advantage that the signal-to-noise ratio of signal lightwave is improved. Further, the optical receiver, the optical detector; and the optical communication system each according to the present embodiment control the quantum state of the signal lightwave, and then carry out optical homodyne detection for the signal lightwave thus treated. Accordingly, the influence of the energy loss of a transmission line on the quantum state of signal lightwave can be avoided. Further, when a bit rate and the intensity of signal lightwave are made equal to those in a conventional communication system, a received signal can be made higher in signal-to-noise ratio than a received signal in the conventional communication system. As a result, the above optical receiver, optical detector and optical communication system can produce the following effects.

(1) When the intensity of signal lightwave and a bit rate are made equal to those in a conventional coherent optical communication system, the bit error rate in a received signal can be made smaller than an ordinary value.

(2) When a bit rate and the bit error rate in a received signal are made equal to those in the conventional communication system, a transmission line for communication is allowed to have more loss than usual, that is, a transmission distance can be elongated.

(3) When the bit error rate in a received signal and the intensity of signal lightwave are made equal to those in the conventional communication system, a bit rate can be made higher than an ordinary value.

(4) when a bit rate and the bit error rate in a received signal are made equal to those in the conventional communication system, signal lightwave can be separated into a plurality of beams, and thus a plurality of optical receivers or detectors can receive the signal lightwave at the same time.

Figure 12:
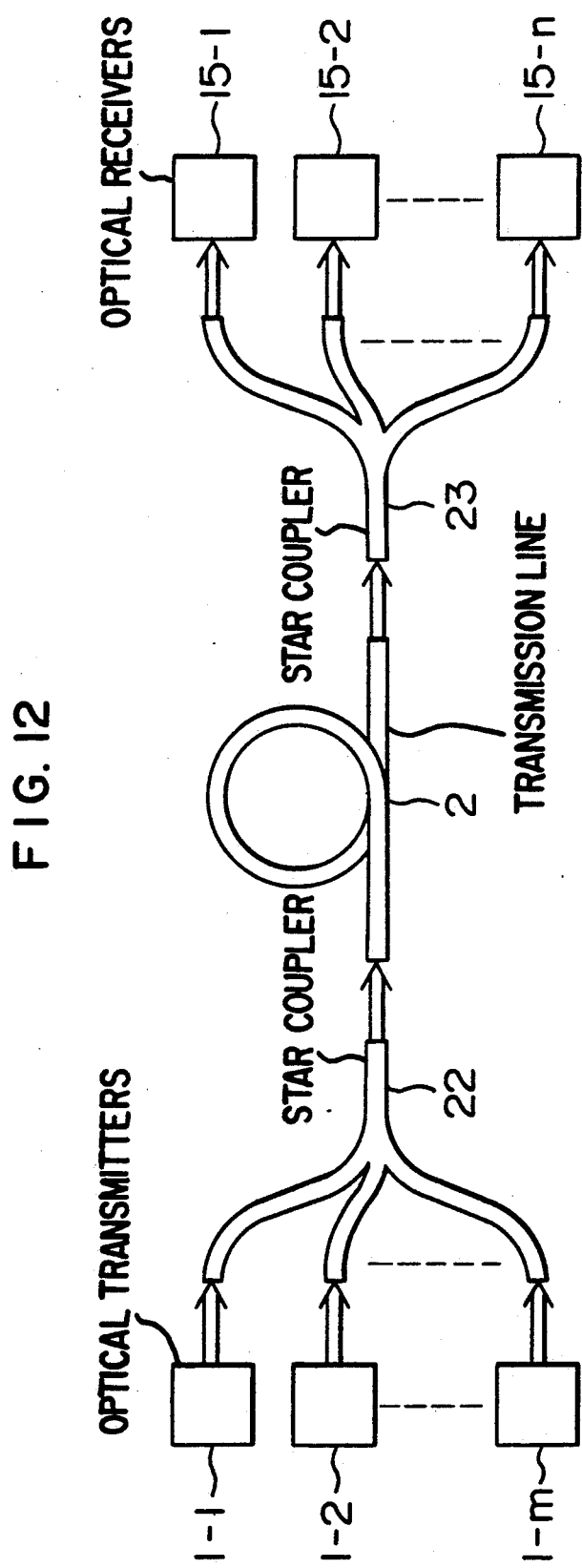
FIG. 12 shows a different embodiment of an optical communication system according to the present invention.

FIG. 12 shows a further embodiment of an optical communication system according to the present invention. In FIG. 12, reference symbols 1-1, 1-2, ... and 1-m designate optical transmitters. Signal lightwave outputted from these optical transmitters and having different carrier frequencies are multiplexed by an optical star coupler 22. The multiple signal lightwave thus obtained passes through a transmission line 2 for communication, and is then separated by an optical star coupler 23 into a plurality of beams, which are supplied to optical receivers 15-1, 15-2, ... and 15-n. In each of the optical receivers, desired received light is extracted from the multiplied optical signal by adjusting the frequency of a local lightwave. One of the numerals m and n may be 1 (one), and it is not always required that the numeral n is equal to the numeral m.

Accordingly to the present embodiment, the same effect as in the optical communication system of FIG. 10 can be obtained, and moreover the construction cost of optical communication system per one optical signal is reduced, since a plurality of optical transmitters and receivers use the transmission line 2 in common.

Figure 13:
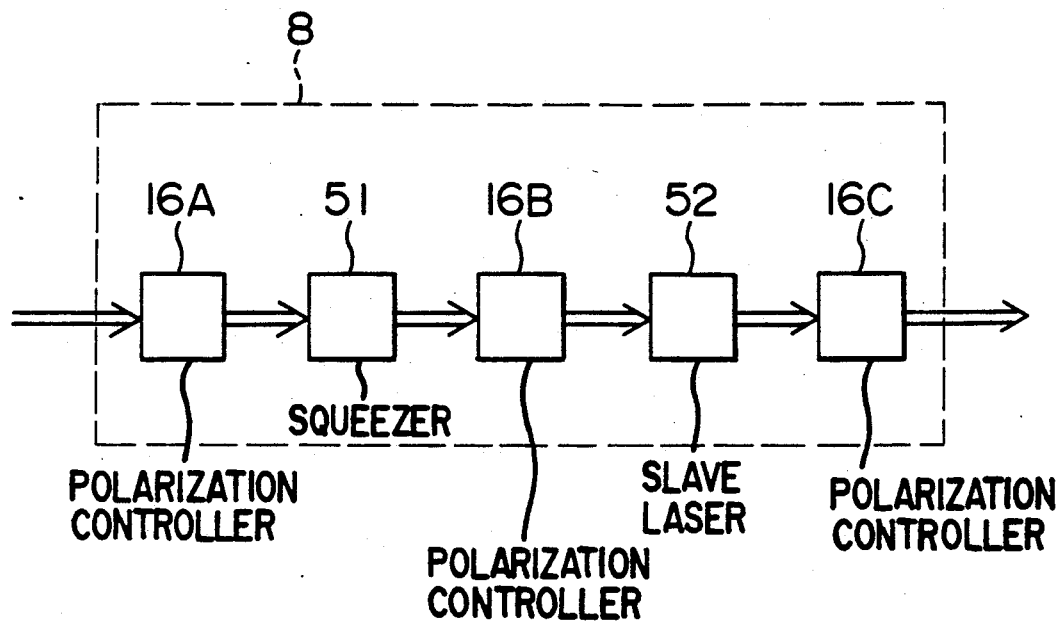
FIG. 13 shows a different embodiment of a quantum state control apparatus according to the invention as shown in FIG. 10.

FIG. 13 shows a further embodiment of a quantum state control apparatus according to the present invention. In FIG. 13, reference numeral 8 designates the present embodiment, 51 a squeezer, and 52 a slave laser. Further, reference symbols 16A, 16B and 16C in FIG. 13 designate polarization controllers for optimizing the state of polarization of signal lightwave incident on one of the squeezer 51, the slave laser 52 and an optical homodyne detector, and for suppressing the influence of variations in state of polarization of signal lightwave due to external disturbance.

The present embodiment can produce the same effect as obtained by the quantum state control apparatus of FIG. 10, and moreover can always perform a stable operation even in a case where the characteristics of each of the squeezer, slave laser and optical homodyne detector are dependent on the state of polarization of signal lightwave, or the state of polarization of signal lightwave fluctuates on account of external disturbance or others. Even when one of the polarization controllers 16A, 16B and 16C is omitted, the same effect as in the present embodiment can be obtained. Further, an optical receiver, an optical detector and an optical communication system which include the present embodiment, do not only produce the same effect as in those of FIG. 10, but also can produce the above-mentioned effect.

Figure 14:
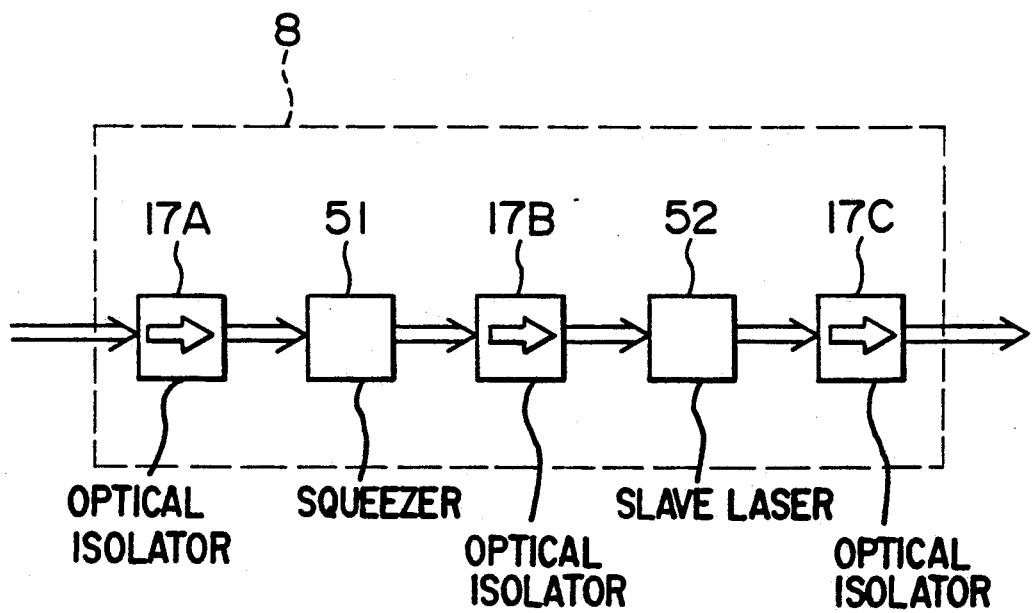
FIG. 14 shows still a different embodiment of a quantum state control apparatus according to the present invention as shown in FIG. 10.

FIG. 14 shows still another embodiment of a quantum state control apparatus according to the present invention. In FIG. 14, reference numerals 8, 51 and 52 designate the same parts as in FIG. 13, and reference symbols 17A, 17B and 17C designate optical isolators for suppressing the propagation of reflected signal lightwave in a reverse direction.

The present embodiment can produce the same effect as obtained by the quantum state control apparatus of FIG. 10, and moreover can suppress the degradation in characteristics of each of the squeezer and the slave laser due to reflected light, and the generation of frequency-amplitude conversion noise in a cavity formed between at least two reflecting positions. Even when one of the optical isolators 17A, 17B and 17C is omitted, the same effect as in the present embodiment can be obtained. Further, when an optical isolator is disposed before and/or behind each polarization controller of FIG. 13, the same effect as in the present embodiment is obtained. An optical receiver, an optical detector and an optical communication system which include the present embodiment, do not only produce the same effect as in those of FIG. 10 and those including the embodiment of FIG. 13, but also can produce the above-mentioned effect.

Figure 15:
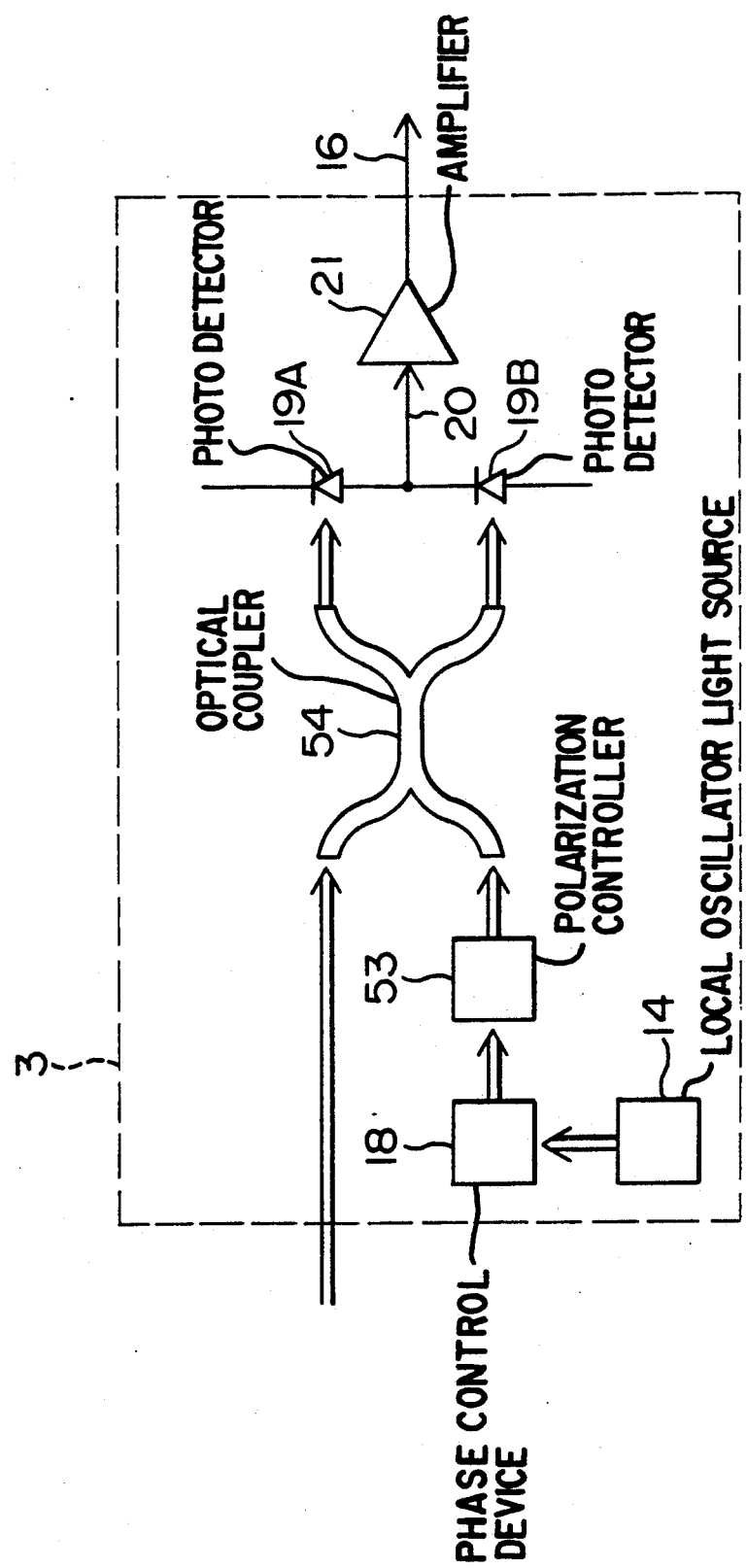
FIG. 15 shows example of an optical homodyne receiver.

FIG. 15 shows an example of a balanced optical homodyne detector. In FIG. 15, reference numeral 14 designates a local oscillator light source for emitting a local lightwave, 18 a phase control device for controlling the phase of the local lightwave so that the local lightwave incident on an optical coupler 54 is substantially equal in phase to the signal lightwave incident on the optical coupler, and 53 a polarization controller for controlling the polarization state of the local lightwave to combine the local lightwave with the signal lightwave in a state that the local lightwave is substantially equal in state of polarization to the signal lightwave. The polarization controller 53 and the phase control device 18 may extract and detect a portion of a received signal to perform a desired control operation. The control devices 53 and 18 may be disposed in reverse order, if necessary. Further, the control devices 53 and 18 may be omitted. Reference symbols 19A and 19B in FIG. 15 designate photo-detectors for detecting combined lightwave. When the photo-detector are connected as shown in FIG. 15, one detection signal is subtracted from the other detection signal, and thus a difference signal 20 is obtained. Intensity noise in the local lightwave is reduced in the above subtraction process. Further, the power of the local lightwave is effectively utilized. The signal 20 is amplified by an amplifier 21, to be used as a received signal. The amplifier 21 may be omitted.

When the optical homodyne receiver of FIG. 15 is used in the above-mentioned optical receiver, optical detector and optical communication system, the power of the local lightwave can be effectively utilized, and intensity noise in the local lightwave can be suppressed. Accordingly, a received signal having a very high signal-to-noise ratio can be obtained.

A quantum state control apparatus according to the present invention can improve the signal-to-noise ratio of signal lightwave.

An optical receiver, an optical detector and an optical communication system which are all constructed in accordance with the present invention, includes a quantum state control apparatus capable of improving the signal-to-noise ratio of signal lightwave, and hence can produce the following effects.

(1) When the intensity of signal lightwave an a bit rate are made equal to those in a conventional coherent optical communication system the bit error rate in a received signal can be made smaller than an ordinary value.

(2) When a bit rate and the bit error rate in a received signal are made equal to those in the conventional communication system, a transmission line for communication is allowed to have more loss than usual, that is, a transmission distance can be elongated.

(3) When the bit error rate in a received signal and the intensity of signal lightwave are made equal to those in the conventional communication system, a bit rate can be made higher than an ordinary value.

(4) When a bit rate and the bit error rate in a received signal are made equal to those in the conventional transmission system, signal lightwave can be separated into a plurality of beams, and thus a plurality of optical receivers or detectors can receive the signal lightwave at the same time.

We claim:

1. A quantum state control apparatus comprising:
a beam splitter for separating a signal lightwave into first and second beams;
a pumping laser put in an injection locking state by the second beam;
a second-harmonic generator for doubling the frequency of the output light of the pumping laser; and
a squeezer for changing the quantum state of the first beam to a squeezed state, the output light of the second-harmonic generator being used as pumping light for the squeezer.

2. An optical receiver comprising:
a quantum state control apparatus according to claim 1; and
an optical homodyne detector for carrying out homodyne detection for the output light of the quantum state control apparatus, the output light being put in a squeezed state.

3. An optical communication system comprising:
an optical transmitter;
a transmission line for communication; and
an optical receiver according to claim 2.

4. An optical receiver comprising:
a squeezer for changing the quantum state of a signal lightwave to a squeezed state;
a slave laser put in an injection locking state by the output light of the squeezer; and
an optical homodyne detector for carrying out optical homodyne detection for a signal lightwave outputted from the slave laser.

5. An optical receiver comprising:
a quantum state control apparatus including at least a squeezer and a slave laser, the squeezer being used for changing the quantum state of a signal lightwave to a squeezed state, the slave laser being put in an injection locking state by a signal lightwave outputted from the squeezer, the signal lightwave outputted from the slave laser being used as the output of the quantum state control apparatus; and
an optical homodyne detector for carrying out optical homodyne detection for the output of the quantum state control apparatus.

6. An optical receiver according to claim 2, wherein the quantum state control apparatus is disposed so as to form the pre-stage of the optical homodyne receiver.

7. An optical detector comprising:
a squeezer for changing the quantum state of a signal lightwave to a squeezed state;
a slave laser put in an injection locking state by the signal lightwave from the squeezer; and
an optical homodyne detector for carrying out optical homodyne detection for the signal lightwave outputted from the slave laser, to detect the signal lightwave incident on the squeezer.

8. A quantum state control apparatus comprising:
a squeezer for changing the quantum state of a signal lightwave to a squeezed state; and
a slave laser put in an injection locking state by the signal lightwave from the squeezer.

9. An optical receiver according to any one of claims 4 to 6, wherein the gain G of the squeezer satisfies the following relation:

$$G \geq \sqrt{1/(1 - \langle n_R \rangle / \langle n_I \rangle)}$$

where $\langle n_R \rangle$ indicates the number of photons included in a single optical signal pulse of the signal lightwave incident on the squeezer, and $\langle n_I \rangle$ indicates the number of photons included in a single optical signal pulse of the signal lightwave outputted from the slave laser.

10. An optical receiver according to any one of claims 4 to 6, further comprising at least one polarization controller for controlling the state of polarization of one of the signal lightwave incident on the squeezer, the signal lightwave outputted from the squeezer, and the signal lightwave outputted from the slave laser.

11. An optical receiver according to any one of claims 4 to 6, wherein at least one of the signal lightwave incident on the squeezer, the signal lightwave outputted from the squeezer, and the signal lightwave outputted from the slave laser, passes through at least one optical isolator.

12. A quantum state control apparatus according to claim 8, wherein at least one of the signal lightwave incident on the squeezer, the signal lightwave outputted from the squeezer, and the signal lightwave outputted from the slave laser, passes through at least one optical isolator.

13. An optical receiver according to any one of claims 4 to 6, wherein the optical homodyne detector is made up of an optical coupler for combining the signal lightwave outputted from the slave laser with a local lightwave, a first photo-detector for converting a first combined light beam from the optical coupler into a first detection signal, a second photo-detector for converting a second combined light beam from the optical coupler into a second detection signal, and a subtracter for subtracting the second detection signal from the first detection signal.

14. An optical communication system comprising:
an optical transmitter including a light source for emitting a lightwave with a single frequency, and an optical modulator carrying out phase shift keying for the lightwave which is emitted from the light source;
a transmission line for transmitting the signal lightwave outputted from the optical transmitter, to serve as a communication line; and
an optical receiver including at least a squeezer, a slave laser and an optical homodyne detector, the squeezer changing the quantum state of the signal lightwave outputted from the transmission line to a squeezed state, the slave laser being put in an injection locking state by the signal lightwave outputted from the squeezer, the optical homodyne detector carrying out optical homodyne detection for the signal lightwave outputted from the slave laser.

15. An optical communication system comprising:
an optical transmitter including a light source for emitting a lightwave with a single frequency, and an optical modulator carrying out amplitude shift keying for the lightwave which is emitted from the light source;
a transmission line for transmitting the signal lightwave outputted from the optical transmitter, to serve as a communication line; and
an optical receiver including at least a squeezer, a slave laser and an optical homodyne detector, the squeezer changing the quantum state of the signal lightwave outputted from the transmission line to a squeezed state, the slave laser being put in an injection locking state by the signal lightwave outputted from the squeezer, the optical homodyne detector carrying out optical detection of the signal lightwave outputted from the slave laser.

16. An optical communication system comprising:
one or more optical transmitters each including a light source for emitting a lightwave with a single frequency, and an optical modulator carrying out phase shift keying for the lightwave which is emitted from the light source;
an optical multiplexer for combining a plurality of signal light beams outputted from the optical transmitters into a single beam;
at least one transmission line for transmitting the signal lightwave outputted from the optical multiplexer, to serve as a communication line;
a beam splitter for separating the signal lightwave outputted from the transmission line into a plurality of signal light beams; and
one or more optical receivers each including at least a squeezer, a slave laser and an optical homodyne detector, the squeezer being supplied with a desired one of the signal lightwave beams from the beam splitter, to change the quantum state of the desired signal lightwave beam to a squeezed state, the slave laser being put in an injection locking state by the signal lightwave outputted from the squeezer, the optical homodyne detector carrying out optical detection of the signal lightwave outputted from the slave laser.

17. An optical communication system comprising:
one or more optical transmitters each including a light source for emitting a lightwave with a single frequency, and an optical modulator carrying out amplitude shift keying for the lightwave which is emitted from the light source;
an optical multiplexer for combining a plurality of signal light beams outputted from the optical transmitters into a single beam;
at least one transmission line for transmitting the signal lightwave outputted from the optical multiplexer, to serve as a communication line;
a beam splitter for separating the signal lightwave outputted from the transmission line into a plurality of signal light beams; and
one or more optical receivers each including at least a squeezer, a slave laser and an optical homodyne detector, the squeezer being supplied with a desired one of the signal light beams from the beam splitter, to change the quantum state of the desired signal light beam to a squeezed state, the slave laser being put in an injection locking state by the signal lightwave outputted from the squeezer, the optical homodyne detector carrying out optical homodyne detection for the signal lightwave outputted from the slave laser.

* * * * *